United States Patent [19]
Lin et al.

[11] Patent Number: 5,398,296
[45] Date of Patent: Mar. 14, 1995

[54] METHOD OF FABRICATING AN OPTICAL ATTENUATOR

[75] Inventors: Song-Fure Lin, Chutung; Chung-Ying Kung, Taipei; Wan-Kwo Lin, Tao-Yuan Hsien, all of Taiwan, Prov. of China

[73] Assignee: Industrial Technology Research Institute, Taiwan, Prov. of China

[21] Appl. No.: 252,569

[22] Filed: May 31, 1994

[51] Int. Cl.⁶ .......................... G02B 6/26; G02B 6/42
[52] U.S. Cl. .......................... 385/96; 385/30; 385/140
[58] Field of Search .................. 385/30, 43, 50, 96, 385/97, 140

[56] References Cited

U.S. PATENT DOCUMENTS

| | | | |
|---|---|---|---|
| 4,557,556 | 12/1985 | Decker | 385/140 |
| 4,557,557 | 12/1985 | Gleason et al. | 385/140 |
| 4,728,170 | 3/1988 | Robertson | 385/140 |
| 4,798,438 | 1/1989 | Moore et al. | 385/30 |
| 4,884,859 | 12/1989 | Yamamoto et al. | 385/140 |
| 5,285,516 | 2/1994 | Wong | 385/140 |

Primary Examiner—Rodney B. Bovernick
Assistant Examiner—Robert E. Wise
Attorney, Agent, or Firm—Michael D. Bednarek

[57] ABSTRACT

A method of producing an optical attenuator with any desired attenuation, by parallelly overlapping and welding two fibers at their ends. A light source is connected to one of the fibers and a power meter is connected to the other. The fibers is heated until readout of the power meter reaches a predetermined value, and a mode filter is applied to the welded portion to prevent unstable mode condition.

8 Claims, 4 Drawing Sheets

METHOD OF FABRICATING AN OPTICAL ATTENUATOR

BACKGROUND OF THE INVENTION

The present invention relates to a method for manufacturing an optical attenuators, and more particularly for manufacturing an optical attenuator by overlapping and welding two optical fibers and then making a mode filter.

An optical attenuator is an important component often used in optical fiber transmission systems. In the present state of the art, some methods for manufacturing optical attenuators have been disclosed. For example, a method is disclosed in U.S. Pat. No. 4,717,234, for attenuating light by inserting an absorption film in the path of light, to absorb a portion of the light by an absorption coating on the film. U.S. Pat. No. 5,095,519 discloses another method for attenuating light by inserting a piece of pure glass fiber between two optical fibers by welding, to scatter a part of light. Furthermore, a method for producing an optical attenuator is disclosed in U.S. Pat. No. 4,884,859 according to the scattering loss principle. In this method, an optical fiber is heated, then twisted or stretched before it is cooled down, to form a series of cracks in the heated region. Light will scatter in the region and therefore be attenuated. However, the above mentioned methods have a common shortcoming in that the attenuation of light is difficult to control.

A method for controlling the attenuation of light is disclosed in U.S. Pat. No. 4,557,556. According to the coupling principle of light, two optical fibers are offset for a short distance, and then welded. Light will be attenuated because the fibers are not completely coupled. The attenuation can be adjusted by adjusting the distance between two fibers core before they cool down. Since the fibers are axially coupled, this method requires ultra smooth end surfaces for the fibers which is very difficult to produce. In addition since the fibers must be axially aligned with high precision such precise alignment is difficult to achieve and results in an excessive number of defective products.

U.S. Pat. No. 5,285,516 discloses a method to produce an optical attenuator by overlapping and welding two fibers, which is suitable for mass production. However, its mode characteristic is unstable, leading to an unstable degree of attenuation, therefore it is not quite practical.

SUMMARY OF THE INVENTION

The objects of the present invention are to provide a method for fabricating an optical attenuator which displays controllable and stable attenuation, and is also suitable for mass production at a lower cost.

The objects of the present invention are fulfilled by providing a method of producing an optical attenuator. The method comprises the following steps of: (a) providing a first optical fiber with a first free end; (b) providing a second optical fiber with a second free end; (c) parallelly overlapping and welding the first free end of the first optical fiber and the second free end of the second optical fiber; (d) slightly separating the fibers to narrow the welded portion of the fibers; and (e) making a mode filter around the welded portions of the fibers.

BRIEF DESCRIPTION OF THE DRAWINGS

The present invention will be more fully understood from the detailed description given hereinafter and the accompanying drawings which are given by way of illustration only, and thus are not limitative of the present invention and wherein.

DETAILED DESCRIPTION OF THE PREFERRED EMBODIMENT

Figure 1:
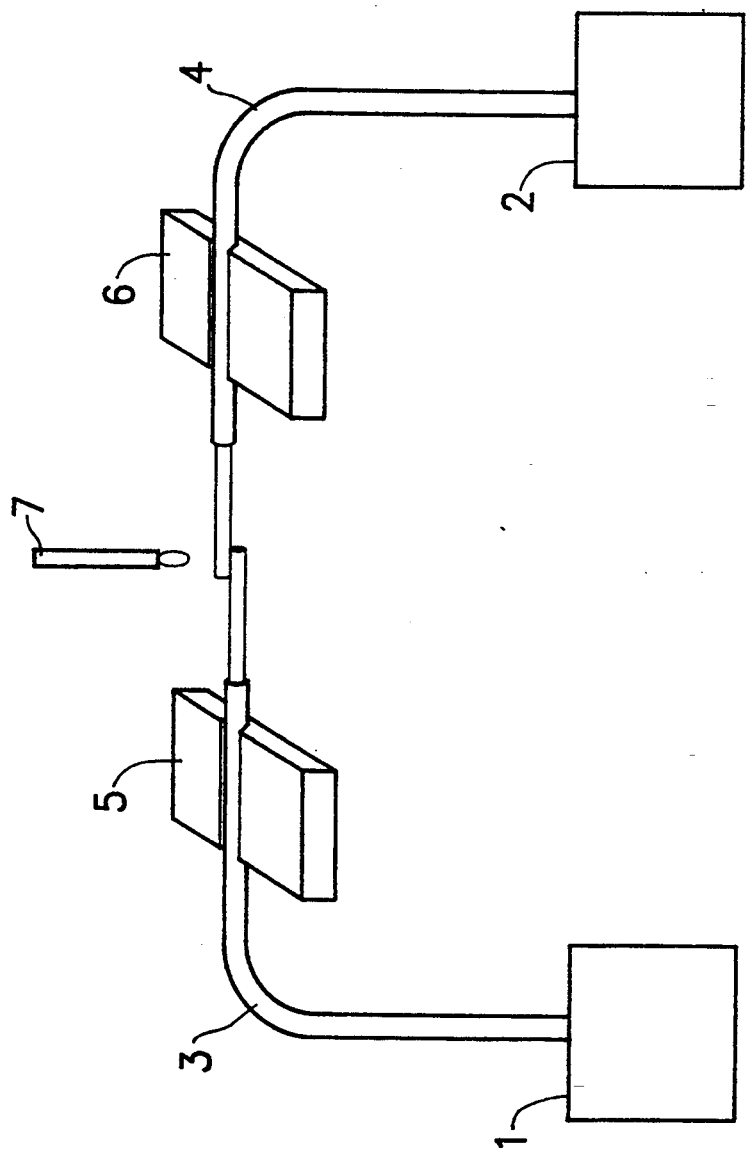
FIG. 1 is a schematic diagram showing the method of producing an optical attenuator according to the present invention.

The equipment used to produce an optical attenuator according to the present invention is shown in FIG. 1, including a light source 1, a power meter 2, two clamps 5 and 6 for clamping optical fibers, and a heater 7. Two ends of a bare fiber are processed and cleaned, then inserted into bare fiber connectors and connected to the light source 1 and the power meter 2 respectively. Therefore, the power meter 2 can receive a light from the light source 1, to get an initial power value. After that, the bare fiber is cut into two fibers 3 and 4. The free ends of the fibers 3 and 4 are also processed and cleaned, and then clamped in clamps 5 and 6 respectively.

Figure 2:
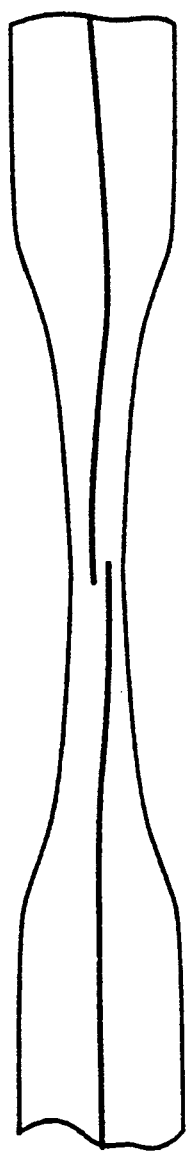
FIG. 2 is a schematic diagram showing the welded and pulled portion of optical fibers.
Figure 3:
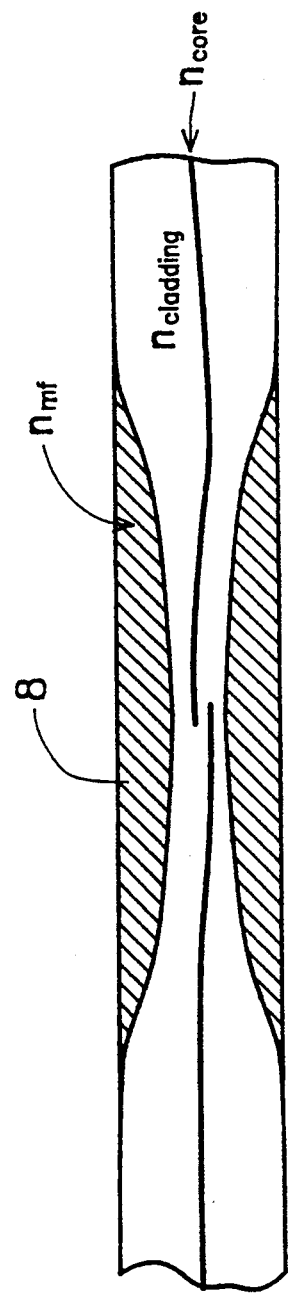
FIG. 3 is a schematic diagram showing the welded and pulled portion of optical fibers, which is applied with a material with a high index of refraction as a mode filter.

The free ends of the two fibers 3 and 4 are slightly overlapped as shown in FIG. 1, and welded by heater 7. The readout of the power meter begins from zero, and increases gradually. After that, the fibers are still heated, so that the coupling between the two fibers increases. When the readout of the power meter reaches a predetermined value, make a mode filter on the filter. In the following, we disclose one of the methods to make a mode filter. The clamps 5 and 6 are slowly separated to pull and narrow the welded portion as shown in FIG. 2. When the readout reaches an object value, e.g. 3 dB, heating is stopped and the fibers are cooled down. After the fibers completely solidify, a material 8 having a high index of refraction is applied to the welded portion as shown in FIG. 3. The high index of refraction ($n_{mf}$) is following the conditions: (i) $n_{mf} > n_{core}$, (ii) $n_{mf} > n_{cladding}$. The material 8 forms a mode filter, which eliminates unstable modes in the welded portion now the fibers constitutes an optical attenuator with a predetermined attenuation. The optical attenuator can be sold commercially after appropriate packing.

Figure 4:
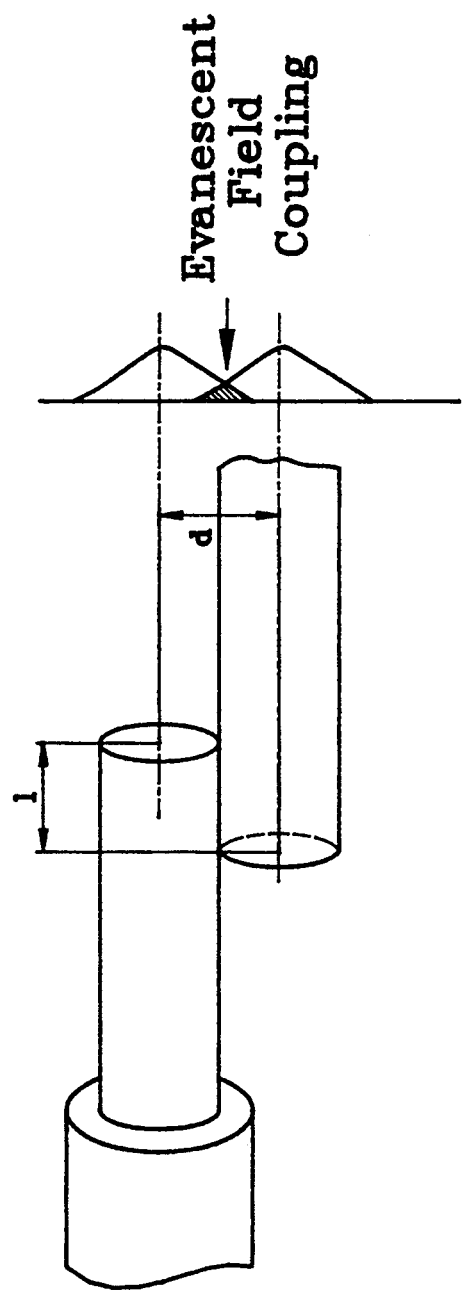
FIG. 4 is a schematic diagram showing the optical coupling between two optical fibers in an optical attenuator according the present invention.
Figure 5:
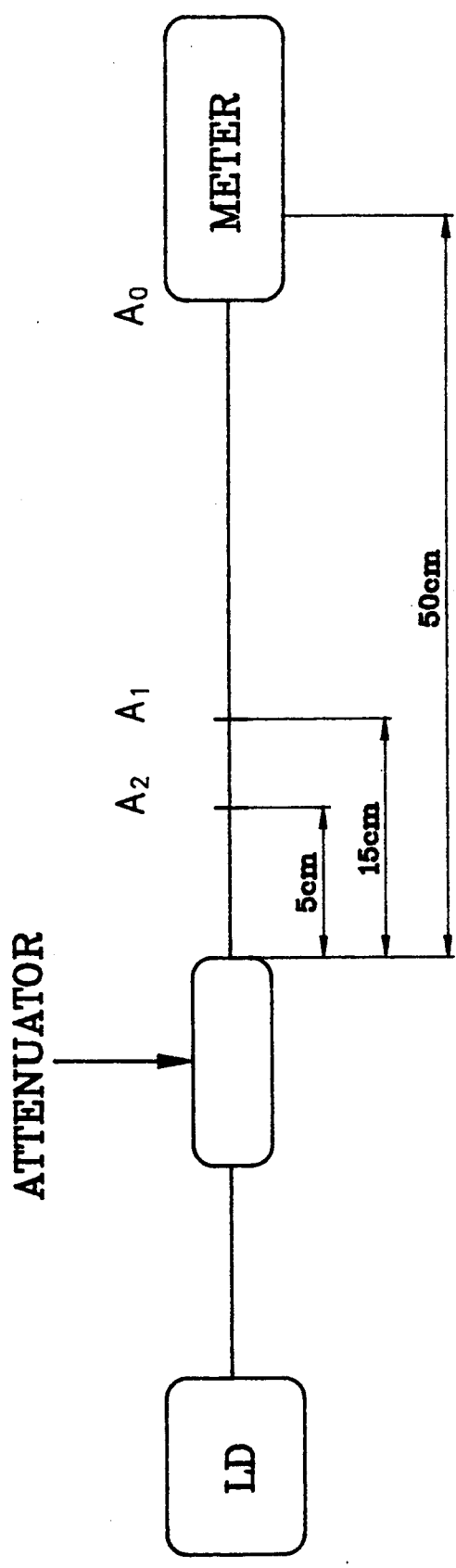
FIG. 5 is a schematic diagram showing the arrangement of tested optical attenuators listed in Table 1.

Please refer to FIG. 4. The optical attenuator of the present invention operates according to the principle of light coupling. When two parallel fibers are closed in such a way that their evanescent fields are overlapped, the fundamental field of one of the fibers will react with that of the other one, and light will be coupled between the two fibers, which is termed "evanescent field coupling". The present invention welds two parallel fibers, so their axes are gradually closed in, thus they are partially coupled. The degree of coupling depends on the distance between two axes d, the length of coupling region 1, and how much the field penetrates the cladding of the fibers. However, if any unstable mode exists in the welded portion, the attenuation will be unstable. Therefore, a mode filter is used in the present invention to obtain stable attenuation. Table 1 lists the attenuation variation at different positions of two attenuators arranged as shown in FIG. 5. It is clear that the attenuation is unstable without the mode filter, and the attenuation with the mode filter is stable.

TABLE 1

| objective attenuation | with mode filter | | | without mode filter | | |
|---|---|---|---|---|---|---|
| | $A_0$ | $A_1$ | $A_2$ | $A_0$ | $A_1$ | $A_2$ |
| 3 dB | 3.2 | 3.2 | 3.1 | 3.0 | 2.5 | 0.8 |
| 5 dB | 5.0 | 4.9 | 4.8 | 5.2 | 4.8 | 1.2 |
| 10 dB | 10.0 | 9.8 | 9.8 | 10.1 | 8.7 | 2.3 |
| 20 dB | 20.1 | 20.0 | 19.7 | 20.2 | 15.0 | 4.5 |

As stated above, the attenuation of the optical attenuator according the present invention, whether 10 dB or 3 dB is desired, could be easily controlled in the manufacturing process monitoring the power meter and controlling the heating time in welding. Such a characteristic makes it suitable to mass product with a very high yield rate. Furthermore, the Attenuation characteristic is very stable, and the equipment needed is minimal and inexpensive.

While the invention has been described by way of examples and in terms of several preferred embodiments, it is to be understood that the invention need not be limited to the disclosed embodiment. On the contrary, it is intended to cover various modifications and similar arrangements included within the spirit and scope of the appended claims, the scope of which should be accorded the broadest interpretation so as to encompass all such modifications and similar structures.

What is claimed is:

1. An optical attenuator, comprising:
 a first optical fiber with a first free end;
 a second optical fiber with a second free end, the first free end of the first optical fiber and the second free end of the second optical fiber being parallelly overlapped and welded to form a welded portion;
 a mode filter being made around the welded portion.

2. An optical attenuator as claimed in claim 1, wherein the mode filter comprises a welded portion of the fibers being pulled and narrowed and a material having a high index of refraction which is formed around the welded portion.

3. A method of producing an i optical attenuator, comprising the following steps of:
 (a) providing a first optical fiber with a first free end;
 (b) providing a second optical fiber with a second free end;
 (c) parallelly overlapping and welding the first free end of the first optical fiber and the second free end of the second optical fiber; and
 (d) making a mode filter around the welded portions of the fibers.

4. A method of producing an optical attenuator as claimed in claim 3, wherein the first optical fiber has another end connected to a light source, the second optical fiber has another end connected to a power meter, and welding is stopped when readout of the power meter reaches a predetermined value.

5. A method of producing an optical attenuator as claimed in claim 4, wherein the first free end of the first optical fiber and the second free end of the second optical fiber are welded after appropriate processing and cleaning in the step (c).

6. A method of producing an optical attenuator as claimed in claim 4, wherein the mode filter comprises a welded portion of the fibers being pulled and barrowed and a material having a high index of refraction which is formed around the welded portion.

7. A method of producing an optical attenuator as claimed in claim 3, wherein the first free end of the first optical fiber and the second free end of the second optical fiber are welded after appropriate processing and cleaning in the step (c).

8. A method of producing an optical attenuator as claimed in claim 3, wherein the mode filter comprises a welded portion of the fibers being pulled and narrowed and a material having a high index of refraction which is formed around the welded portion.

* * * * *

UNITED STATES PATENT AND TRADEMARK OFFICE
CERTIFICATE OF CORRECTION

PATENT NO. : 5,398,296
DATED : March 14, 1995
INVENTOR(S) : Song-Fure LIN, et al.

It is certified that error appears in the above—identified patent and that said Letters Patent is hereby corrected as shown below:

> On the title page, item [75] Inventors: "Prov. of China" should read --Rep. of China--.

Signed and Sealed this

First Day of August, 1995

Attest:

BRUCE LEHMAN

Attesting Officer     Commissioner of Patents and Trademarks